C. KASPAR.
TROLLEY MECHANISM FOR RAILWAY CARS.
APPLICATION FILED JULY 11, 1914.
1,149,651.
Patented Aug. 10, 1915.
2 SHEETS—SHEET 1.
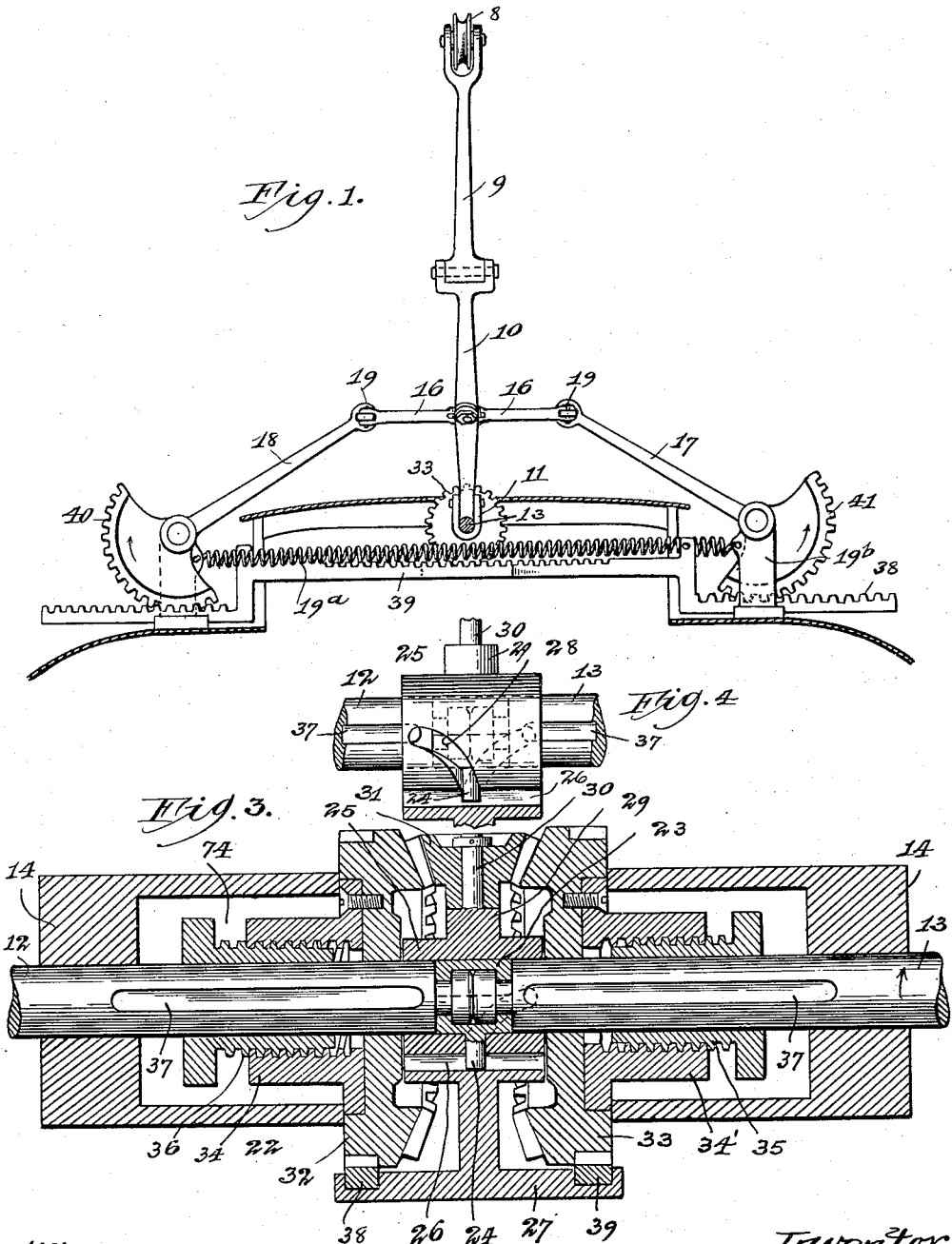

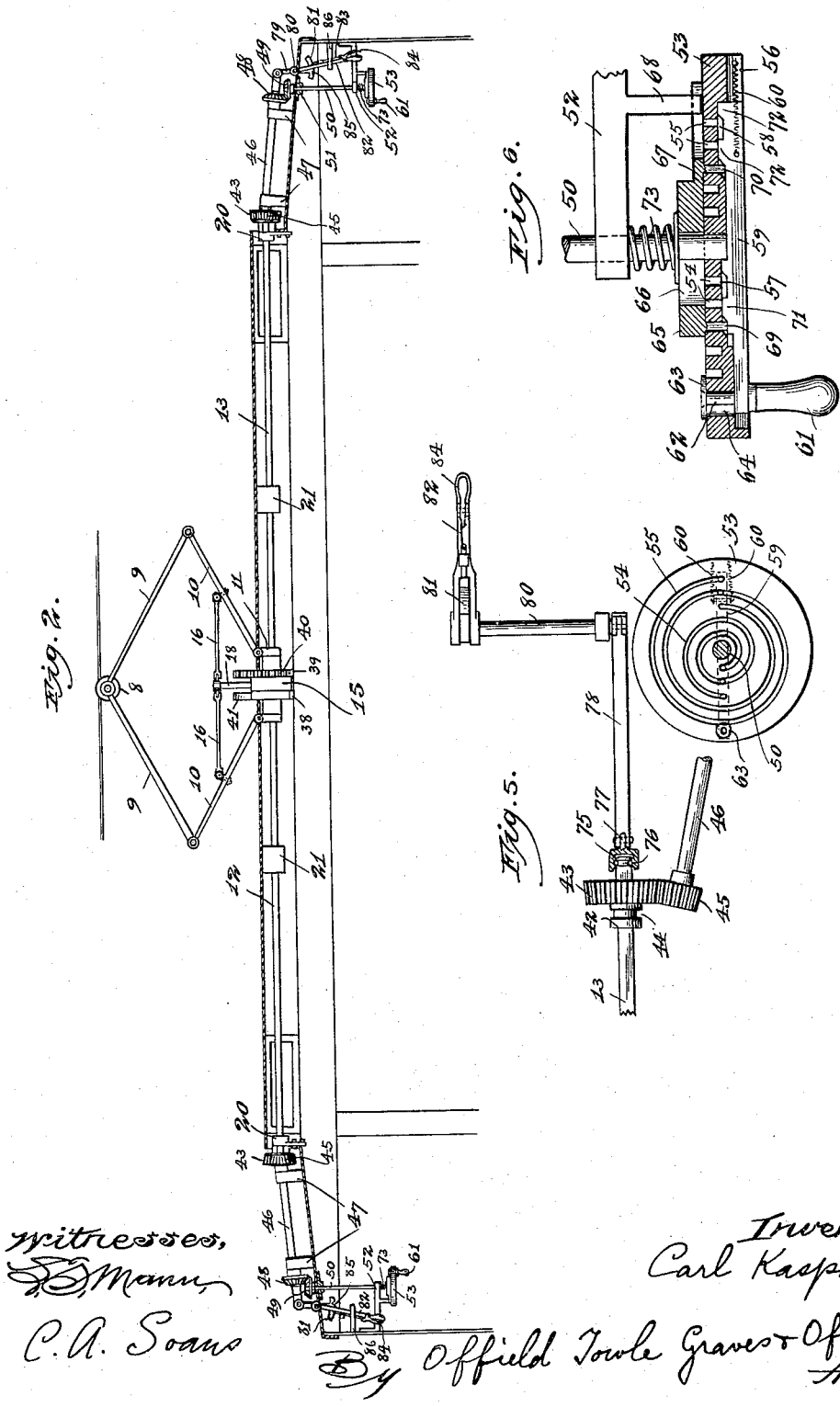

UNITED STATES PATENT OFFICE.

CARL KASPAR, OF CHICAGO, ILLINOIS.

TROLLEY MECHANISM FOR RAILWAY-CARS.

1,149,651.   Specification of Letters Patent.   Patented Aug. 10, 1915.

Application filed July 11, 1914. Serial No. 850,493.

*To all whom it may concern:*

Be it known that I, CARL KASPAR, a subject of the Emperor of Austria-Hungary, residing in Chicago, in the county of Cook and State of Illinois, have invented certain new and useful Improvements in Trolley Mechanisms for Railway-Cars, of which the following is a specification.

My invention relates to trolley mechanisms for cars operated on electric railways, and particularly concerns a novel and improved mechanism for operating and controlling the trolley wheel carrier, and adapted to facilitate the finding of the wire by the motorman or conductor from either end of the car.

Although a number of so-called finders have been proposed and operated to some extent, they have never found much favor with practical electric railway men, since they have been either too complicated, or faulty in construction, or so limited in capacity as to be of little practical value.

Among the salient objects of my present invention are, to provide a trolley mechanism that shall be capable of being operated by the motorman or conductor from either end of the car without the necessity of leaving the car; to provide a trolley apparatus in which the operator shall have absolute control of the trolley-wheel carrier and wheel during both vertical and lateral movements of the latter so as to enable him readily to guide the wheel directly into contact with the wire; to provide improved trolley mechanism in which the vertical and lateral movements of the trolley-wheel carrier may occur without any interference with or hindrance from the operating mechanism of the said carrier; to provide a mechanism wherein the trolley-wheel carrier may be readily drawn down and locked in lowered position whenever desired, for instance, when the car is to be sent into the barns; to provide a trolley mechanism which will obviate the slipping of the trolley-wheel off the wire and will insure its remaining in continuous contact with the wire regardless of the speed of the car or of the curvature and unevenness of the track or trolley wire; to provide an improved trolley-mechanism of the class referred to which shall be comparatively simple and economical in construction, and, in general, to provide an improved trolley mechanism of the class referred to.

My invention consists in the matters hereinafter described and more particularly pointed out in connection with the accompanying drawings in which I have illustrated one practical form of my invention, and in which—

Figure 1 is an end elevation of my improved trolley mechanism, showing certain parts in section; Fig. 2 is a side elevation of Fig. 1, showing certain parts of the car in section; Fig. 3 is a longitudinal section of the central gear box and associated parts; Fig. 4 is a fragmentary view of one of the parts shown in Fig. 3; Fig. 5 is a detail view, showing the means employed at the end of the car, certain parts being broken away for operating the trolley-carrier, and Fig. 6 is a section through one of the hand-wheel mechanisms employed for raising and lowering the trolley.

Referring to the drawings, it will be seen that the trolley-carrier as a whole is of the modified pantograph type. The trolley-wheel 8 is carried by a pivot which connects a pair of longitudinally extending arms 9, which latter are pivoted to the outer ends of a pair of arms 10. These latter arms 10 are pivotally connected to the upper ends of a pair of short sleeves 11, which latter are loosely mounted upon shafts 12 and 13 supported in bearings 14 forming the gear case 15. It will thus be manifest that the pantograph construction composed of the arms 9 and 10 will thus be permitted to partake of a vertical movement owing to the pivotal connections of said arms 9 and 10, and also will accommodate itself to transverse movement around the axes of the shafts 12 and 13, due to the rotatable connection of the sleeves 11 upon which the arms 10 are mounted. Intermediate of the lengths of the arms 10 I pivotally connect to each of the said arms a pair of laterally extending arms 16, each pair of arms being also pivotally connected to the opposite pair of arms by pivot joint connections carried by the swinging levers 17 and 18. It will thus be seen that the four arms 16 form in effect a horizontal pantograph arrangement whose lateral contraction or extension controls the distance of the trolley-wheel 8 from the top of the car. It is also apparent that if the two arms 17 and 18 have the same inclination, the two pivot points 19 will be situated at equal distances from the center of the car, and, consequently, the trolley-wheel 8 will be in line with the center of the track. If, however, one of the arms 17 and 18 has a different inclination from the other, this will result in a corresponding displacement of the center of the horizontal pantograph formed by the arms 16, and the result will be that the vertical pantograph carrying the trolley-wheel 8 will be accordingly displaced to one or the other side of the center of the track. The trolley-wheel 8 is maintained in contact with the wire by means of a pair of springs 19$^a$ which are cross-connected between the levers 17 and 18 and the brackets 19$^b$, the springs causing the ends 19 of the levers 17 and 18 to be urged upwardly and outwardly, thus tending to extend the horizontal pantograph in a transverse direction, which results in a tendency to extend the vertical pantograph in an upward direction and so force the wheel against the trolley wire.

The shafts 12 and 13 previously referred to are supported at their outer ends in bearings 20 mounted at the ends of the car and preferably, where the car is long, they are supported by intermediate bearings 21. These shafts 12 and 13 extend at their adjacent ends into the gear box designated as a whole 22, and the ends of the shafts are reduced in diameter and also grooved so as to enable them to be connected together against mutual longitudinal movement by means of a flanged collar 23. This flanged collar 23 permits either of the shafts to rotate with reference to the other shaft, but compels both of the shafts to move together in either longitudinal direction. The collar 23 also carries an integral pin 24 which is long enough to extend through a slotted sleeve 25 and engage and slide in a longitudinal keyway 26 formed in the stationary bracket 27. The sleeve 25 is provided with a slot 28 which is wide enough to accommodate the pin 24 and extends in spiral direction half way around its diameter, the longitudinal displacement of the ends of said slot being equal to the greater part of the length of said sleeve. The pin 24 ordinarily occupies the position shown in Figs. 3 and 4 in the center of the said slot, which thus causes the said sleeve to occupy the position shown. On the upper end of the slotted sleeve 25 there is formed an upstanding boss 29 in which is secured a pin 30, the latter carrying a free-running bevel pinion 31. This bevel pinion 31 is adapted to mesh simultaneously with a pair of bevel gears 32 and 33 which are adapted to rotate freely upon the ends of the shafts 12 and 13. In order to keep the gears 32 and 33 in constant mesh with the bevel pinion 31, they are kept spaced apart by the ends of the sleeves 25 and kept together by the inner annular ends of the members 14. The outer faces of the said bevel gears 32 and 33 carry a pair of hubs 34 and 34′ which are similarly threaded to fit a pair of sleeves 35 and 36, the latter having flanges which limit their outward movement as they are screwed into the hubs 34 and 34′, and also having splined engagement with keyways 37 formed in the ends of the shafts 12 and 13. The bevel gears 32 and 33 in addition to their bevel teeth have formed upon their outer peripheries a series of spur teeth which are adapted to engage a pair of rack members 38 and 39 which are adapted to slide in a pair of grooves formed in the base of the bracket 27. These rack bars 38 are extended transversely across the roof of the car and have their ends offset and also furnished with teeth which engage a pair of sector gears 40 and 41 which form the lower ends of the levers 17 and 18.

Referring to Figs. 5 and 6, which show the arrangement at one end of the car for controlling the trolley mechanism, the shaft 13 is squared at the end and is adapted to slide in the hub 42 of the large bevel gear 43 which is prevented from sliding longitudinally on the shaft 13 by means of a groove 44 in its hub which engages a corresponding part (not shown) of the bearing 20. The bevel gear 43 is adapted to mesh with a small bevel pinion 45 carried by the end of a slightly inclined shaft 46 which is suitably supported in a pair of bearings 47, and at its outer end carries a small bevel pinion 48. This bevel pinion 48 meshes with a bevel pinion 49 carried by the upper end of a vertical shaft 50 which is adapted to rotate in bearings 51 and 52. The shaft 50 is supported against endwise movement by the hub of the bevel gear 49 engaging the top of the bearing 51, and the lower end of the said shaft projects some distance below the lower bearing 52. On the extreme lower end of the shaft 50 there is keyed a crank disk 53 which, as shown in Fig. 5, has its upper face provided with a pair of spiral grooves 54 and 55, the said grooves extending approximately half way through the thickness of the disk 53 and each forming a pair of convolutions in the upper surface of the said disk. The ends of the grooves are all located upon the same diameter, and across said diameter on the under side of the disk 53 there is milled a groove 56 which has a pair of slightly deeper portions 57 and 58 which meet the bottoms of the grooves in the upper face of the disk. Within this groove 56 there slides a longitudinal cam bar 59, which is normally retracted into the position shown in Fig. 6 by means of a spring 60 which is attached to one end of the said bar. The other end of the bar carries a depending handle 61 which has a reduced neck portion 62 extending through the disk and riveted over into a washer 63 which thus prevents the cam-bar 59 from dropping out of the groove 56. The hole through which the neck 62 extends is suitably slotted, as shown at 64, in order to permit the requisite endwise movement of the cam-bar 59. Mounted upon the upper face of the disk 53 is a spring-pressed member 65 which is slotted, as shown at 66, in order to be capable of endwise movement with respect to the shaft 50 and has a longitudinal extension 67 also slotted to permit the same amount of relative endwise movement with reference to a pin or lug 68 depending from the bearing 52. In the lower face of this member 65 there are set a pair of pins 69 and 70, these pins being slightly longer than the depth of the spiral grooves 54 and 55. It is thus apparent that when the crank disk 53 is in such position that the two pins 69 and 70 occupy the position shown, they extend through into the diametral slot 56 and prevent movement of the disk 53 with reference to the locking member 65, which latter member is prevented from rotating by the lug 68 entering the slot in its extension 67. Referring to Fig. 6, it will be seen that the cam-bar 59 has two pairs of upwardly extending cam projections 71 and 72 which lie in the deep grooves 57 and 58. The beveled edges of these cam projections are adapted to lift the ends of the pins 69 and 70 out of grooves 57 and 58 against the pressure of the spring 73 when the handle 61 is pulled outwardly against the tension of the spring 60; and having lifted the pins out of the said grooves, it is then possible for the operator to rotate the disk as a whole by means of its handle 61 in the direction which will cause the pins 69 and 70 to travel along the grooves 54 and 55.

It should be noted that the operator simply gives an initial outward pull upon the handle 61 in order to unlock the disk, and afterward, while rotating the disk upon the handle, he permits the spring 60 to pull the cam-bar back into its original position, as shown. When the cam disk has made a complete revolution, the pins 69 and 70 are then again above the deep grooves 57 and 58, but since the cam-bar has been restored to its original position by the spring 60, the cam projections 71 and 72 prevent the said pins from entering the grooves 57 and 58 and consequently the rotation of the crank disk is not interrupted. However, as soon as the crank disk has made a pair of complete revolutions, the pins 69 and 70 strike the ends of the spiral grooves 54 and 55, while at the same time they enter the grooves 57 and 58 since there is no obstruction to their entering when they are at the ends of said spiral grooves 54 and 55.

The mechanism just described results in the effective locking of the crank disk 53 when it has been placed in the desired position, while at the same time it permits of the crank disk being rotated for two and only two complete revolutions. It may be mentioned here that the purpose of revolving the crank disk 53 an amount equal to two revolutions is, either to pull down the trolley into its inactive position adjacent the roof of the car, or, if the trolley-wheel be in this inactive position, to provide sufficient freedom in the gear mechanism to allow the wheel to assume its position of maximum vertical height.

The lowering and raising of the trolley, due to the revolving of the crank disk 53, is accomplished as follows. Obviously, when the crank disk is revolved, the shaft 50 rotates the shaft 46 through the miter gears 48 and 49 and the shaft 46 transfers this rotary movement to the shaft 13 through the bevel gears 45 and 43. As the shaft 13 rotates, the worm screw 35, being splined to it, also rotates and moves in a longitudinal direction upon the shaft. We will now assume that the trolley-wheel is in operation upon the wire and that it is desired to lower the pantograph until the trolley-wheel is adjacent the roof of the car and thus inactive. The position in which the trolley is operative corresponds with the position of the gear mechanism shown in Fig. 3. Assuming now that the members 35 and 34' are threaded in a right-hand direction, if the shaft 13 be turned in the direction of the arrow the member 35 will be screwed into the member 34' and finally its flange will strike the end face of the member 34', and the two members will thus be locked together and will rotate in unison with the shaft 13. The rotation of the member 34' thus effected, will operate the rack bar 39 in an outwardly direction and the toothed sector member 40 will revolve in the direction of the arrow. As soon as the bevel gear 33 commences to rotate, it will obviously rotate the bevel pinion 31 since the latter is prevented from rotating around the shafts 12 and 13 by the pin 24. The rotation of the bevel pinion 31 results in a corresponding rotation of the bevel gear 32 with which it meshes, and the rotation of this bevel gear 32 will obviously be in a direction opposite to that of the rotation of the bevel gear 33. This results in a movement of the rack bar 38 in a direction contrary to the direction of movement of the rack bar 39, and thus the said rack bar 38 will also move in an outwardly direction and rotate the toothed sector member 41 in the direction shown by the arrow in Fig. 1. Thus the two levers 17 and 18 will be depressed and the horizontal pantograph formed by the members 16 will obviously be squeezed out longitudinally of the length of the car and this will thus result in a corresponding lowering of the vertical pantograph and the trolley-wheel carried at its apex. The ratio of the gearing between the sector members, the racks, the bevel gears 32 and 33, the pitch of the threads of the members 34 and 34', and the ratio of the bevel gears at the ends of the cars are all such that when the crank disk 53 is rotated an amount equal to two revolutions, the trolley-wheel is lowered a distance equal to the difference in height between the maximum extension of the vertical pantograph and its lowest position. It will be noted that this lowering of the pantograph may be effected from either end of the car, since when one shaft is operated the other is locked by means of its associated crank disk at the other end of the car. This may be explained as follows: When the shaft 13 rotates and screws the two members 34' and 35 into locked engagement and then turns the gears 32 and 33, the gear 32 turns in a direction to unscrew the members 34 and 36 and thus the gap 74 between their adjacent faces, is widened out. It is of course understood that the length of active thread on the members 34 and 36 is such that there is no danger of the two members becoming completely unscrewed and thus falling out of engagement, when the shaft at the other end of the gear box is operated to depress the trolley. In this connection, it should be understood that although it is possible to lower the trolley from either end of the car, it is impossible to restore the trolley to its active position unless both of the crank disks 53 be turned into the proper position.

Describing now the mechanism employed to enable the conductor or the motorman to find the trolley-wheel with the trolley in case the latter has become displaced for any reason, referring to Figs. 2 and 5, it will be seen that on the extreme outer end of the shaft 13 there is located an end collar 75 which has rotary engagement with a groove 76 in the end of the said shaft 13, the said groove also preventing relative endwise movement of the collar 75 and the shaft 13. On the outer end of the collar 75 there is a lug 77 with which is pivotally connected a bar 78, the latter being also pivotally connected to a vertically upstanding lever 79. The lever 79 is mounted upon a pivot shaft 80 fixed to the car roof, and upon the other end of the said pivot shaft 80 is keyed a depending lever provided with a sector arm 81. Loosely mounted upon the shaft 80 and embracing said sector arm 81 swings a hand-lever 82, and carried by the side of said lever in a convenient manner is a longitudinally extending lock-rod 83 operated by the hand-grip 84. The end of this lock-rod 83 is adapted to enter a notch 85 in the edge of the sector arm 81 when the said lever 83 is brought down into the proper position.

Normally, however, the said lever 83 is maintained in the position shown with lock-rod out of engagement with the notch 85 by means of a spring-fork 86 which is secured to the end of the car.

We will now assume that the trolley has become unshipped from the wire, due to some inequality in the track or some defect in the trolley wire itself, and it is desired to restore the wheel into engagement with the trolley wire. As previously described, either of the crank disks 53 may be turned in order to bring the trolley wheel down below the level of the wire, and if the trolley wire were found to be directly above the wheel after the wheel was lowered, nothing further would have to be done but simply to again restore the crank disk 53 to its original position and the trolley would rise and resume its contact with the wire. However, in this case we will assume that the trolley-wheel is found to be at one side or the other of the wire and consequently cannot be engaged by simply causing the trolley-wheel to rise upwardly. In this case either the conductor or the motorman at either end of the car pulls the hand-lever 82 out of its fork 86 and then engages the lock-rod 83 with the notch 85, and he is then able to rock the pivot shaft 80 and thus move the shaft 13 longitudinally of its axis, without, however, rotating the latter. This longitudinal movement of the shafts 12 and 13 results in a sidewise movement of the trolley-wheel, which is accomplished in the following manner. Referring to Fig. 3, it will be remembered that the pin 24 slides longitudinally in the guideway 26 in the fixed bracket 27, and interposed between the member 23 and the said bracket 27 is the slotted sleeve which carries the bevel pinion 31. It is thus apparent that a longitudinal movement of the pin 24 will cause the said pin to operate cam fashion upon the slot in the said sleeve 25 and will cause a partial bodily rotation of the latter around the ends of the shafts 12 and 13. This bodily rotation of the bevel wheel 31 around the ends of the shafts 12 and 13 effects a change in the relative heights of the ends 19 of the levers 17 and 18 in the following manner. Assuming, for the sake of argument, that the two sides of the pantograph movement are subject to the same amount of frictional resistance against the movement of the various parts, it is obvious that no rotation of the bevel gear 31 will be effected by its bodily rotation around the said shafts, but, on the other hand, both of the bevel wheels 32 and 33, which are in mesh with said bevel pinion 31, will each rotate an amount equal to the bodily displacement of the bevel gear 31 around the axis of the main shafts. Thus both of the rack-bars 38 and 39 will be moved in the same direction, and this will result in the lowering of one of the pivots 19 and a corresponding elevation of the other of said pivots. As is manifest from an inspection of Fig. 1, a difference in the elevation of the pivots 19 will result in the displacement of the vertical pantograph from its vertical position and it will pivot upon the shafts 12 and 13, causing the wheel 8 to be moved from its vertical position.

It should be understood that it is not necessary that the two bevel gears 32 and 33 should move in unison, because, if one of them is subject to more friction than the other, this will result in the rotation of the bevel pinion 31 and the other bevel gear will rotate an amount equal to twice the bodily rotation of the bevel pinion 31 around the axes of the main shafts. So that the result will be the same, since, although one of the pivots 19 remains stationary, the other one is raised or depressed a double amount and the same effect is obtained as if both of the bevel gears 32 and 33 were rotated when the bevel pinion 31 was moved bodily around the axis of the main shaft.

After the trolley-wheel 8 has been displaced sidewise sufficiently to locate it beneath the trolley wire, the crank disk 53 which has been operated is then turned to its normal position which allows the trolley-wheel to rise and make contact with the wire. After the trolley-wheel has been reshipped in the above described manner, the lever 82 is disconnected from the sector 81 by withdrawing the lock-rod 83, and the lever is then pushed back into engagement with its retaining fork 86 and the operation is complete.

It should be understood that under ordinary conditions, while the car is running, a displacement of the trolley-wheel relatively to the center of the track, which of course results in a swaying of the vertical pantograph carrying the trolley-wheel, also results in a slight endwise movement of the shafts 12 and 13 caused by a reversal of the cycle of movements previously described in connection with the displacement of the trolley to ship the latter in contact with a trolley wire which is at one side of the center of the track. In other words, as the vertical pantograph sways from side to side when the car is running, the bevel gears 32 and 33 will be correspondingly oscillated by the rack-bars 39 and 38 and the movement of the said bevel gears 32 and 33 will result in a corresponding bodily rotation of the bevel gear 31 around the axes of the main shafts, this movement also resulting in a longitudinal movement of the pin 24, due to its cam action in the groove 28. Thus, as the trolley sways from side to side the shafts 12 and 13 reciprocate slightly longitudinally of the car and cause a slight rocking of the sectors 81 on their pivots. However, this movement is in practice extremely limited and does not result in any undue wear or other bad effects.

It will be manifest to those skilled in the art that the described mechanism may otherwise be modified in respect to details without involving any departure from the principles involved or sacrificing any of the benefits and advantages of the invention. Hence, I do not limit the latter to the particular mechanism disclosed, except to the extent clearly indicated in specific claims.

I claim—

1. The combination of a car body, a trolley-wheel, a normally vertically extensible pantograph supporting said trolley-wheel and supported by said car body, and a normally horizontally extensible pantograph connected to said vertical pantograph and adapted to contract or extend the same.

2. The combination of a car body, a trolley-wheel, a normally vertically extensible pantograph supporting said trolley-wheel and supported by said car body, a normally horizontally extensible pantograph connected to said vertical pantograph and adapted to contract or extend the same, and means for inclining said horizontal pantograph to effect an inclination of said vertical pantograph.

3. The combination of a car body, a trolley-wheel, a longitudinally extending pantograph normally vertical and adapted to support said wheel and supported on said car body, a normally horizontal pantograph connected at two of its corners to adjacent arms of said vertical pantograph, means for laterally displacing the center of said horizontal pantograph to effect an inclination of said vertical pantograph, and automatic means for extending said pantograph in a vertical direction to raise said wheel.

4. The combination of a car body, a trolley-wheel, a pantograph extending longitudinally of said car body and supporting said wheel and supported by said car body, said pantograph being vertically extensible and bodily pivoted upon an axis parallel with the direction of motion of said car, a normally horizontal pantograph connected at two of its opposite corners to adjacent arms of said vertical pantograph, pivoted arms mounted on said car body and pivotally connected to the other two corners of said horizontal pantograph, and automatic means adapted to elevate said arms.

5. The combination of a car body, a trolley-wheel, a pantograph extending longitudinally of said car body and supporting said wheel and supported by said car body, said pantograph being vertically extensible and bodily pivoted upon an axis parallel with the direction of motion of said car, a normally horizontal pantograph connected at two of its opposite corners to adjacent arms of said vertical pantograph, pivoted arms mounted on said car body and pivotally connected to the other two corners of said horizontal pantograph, and manually controlled means for raising said arms a different amount.

6. The combination of a car body, a trolley-wheel, a pantograph extending longitudinally of said car body and supporting said wheel and supported by said car body, said pantograph being vertically extensible and bodily pivoted upon an axis parallel with the direction of motion of said car, a normally horizontal pantograph connected at two of its opposite corners to adjacent arms of said vertical pantograph, pivoted arms mounted on said car body and pivotally connected to the other two corners of said horizontal pantograph, automatic means for elevating said arms to raise said trolley-wheel, and manually controlled means for effecting a difference in the amount of elevation of said arms.

7. The combination of a car body, a trolley-wheel, trolley-supporting mechanism interposed between said wheel and said car body normally adapted to elevate and maintain said trolley-wheel in the plane of the center line of said car, a longitudinal shaft extending from said trolley mechanism to one end of the car, means for rotating said shaft in order to effect a positive downward movement of said trolley-wheel, and means for reciprocating said shaft in order to displace said trolley-wheel laterally from its normal vertical position.

8. The combination of a car body, a trolley-wheel, pantograph mechanism interposed between said trolley-wheel and said car body and adapted automatically to raise said wheel in a vertical plane, a shaft extending between said pantograph mechanism and one end of the car, gearing interposed between said shaft and said pantograph mechanism, means for rotating said shaft to effect a positive lowering of said trolley-wheel, and means for reciprocating said shaft to effect a transverse movement of said trolley-wheel out of its normal vertical plane of movement.

9. The combination of a car body, a trolley-wheel, pantograph mechanism interposed between said trolley-wheel and said car body and adapted automatically to raise said wheel in a vertical plane, a shaft extending between said pantograph mechanism and one end of the car, gearing interposed between said shaft and said pantograph mechanism, means for rotating said shaft to effect a positive lowering of said trolley-wheel, means for reciprocating said shaft to effect a transverse movement of said trolley-wheel out of its normal vertical plane of movement, and means including manually operated mechanism normally disconnected from said shaft.

10. The combination of a car body, a trolley-wheel, pantograph mechanism supporting said wheel and supported by said car, mutually co-acting members on either side of said pantograph mechanism for elevating said wheel in a vertical direction by means of said pantograph, said co-acting members normally operating in unison, and means manually controlled from one end of said car to effect a difference in the amount of movement of said mutually co-acting members in order to effect the transverse movement of said trolley-wheel out of its normal vertical plane of movement.

11. The combination of a car body, trolley-supporting mechanism normally adapted to elevate a trolley-wheel in a vertical plane, a pair of members adapted to support said trolley supporting mechanism at either side of its vertical plane of movement, a pair of gears connected to said supporting members, and gearing interposed between said two gears and adapted to control the amount of relative rotation of said two main gears.

CARL KASPAR.

Witnesses:
EMILIE ROSE,
LOUIS T. MANN.

Copies of this patent may be obtained for five cents each, by addressing the "Commissioner of Patents, Washington, D. C."